United States Patent
Hernandez-Garduno et al.

(10) Patent No.: US 8,035,440 B2
(45) Date of Patent: Oct. 11, 2011

(54) MULTISTAGE CHARGE PUMPS WITH DIODE LOSS COMPENSATION

(75) Inventors: David Hernandez-Garduno, Dallas, TX (US); Mohammad Al-Shyoukh, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 62 days.

(21) Appl. No.: 12/345,255

(22) Filed: Dec. 29, 2008

(65) Prior Publication Data

US 2009/0256627 A1 Oct. 15, 2009

Related U.S. Application Data

(60) Provisional application No. 61/045,155, filed on Apr. 15, 2008.

(51) Int. Cl.
*G05F 1/10* (2006.01)
*G05F 3/02* (2006.01)

(52) U.S. Cl. ......... 327/536; 327/537; 327/538; 327/535

(58) Field of Classification Search .................. 327/148, 327/157, 534–537; 363/59, 60
See application file for complete search history.

(56) References Cited

U.S. PATENT DOCUMENTS

| | | | | |
|---|---|---|---|---|
| 5,642,072 A * | 6/1997 | Miyamoto et al. | ............ | 327/535 |
| 6,107,862 A * | 8/2000 | Mukainakano et al. | ...... | 327/536 |
| 6,400,211 B1 * | 6/2002 | Yokomizo et al. | ............ | 327/536 |
| 6,642,774 B1 * | 11/2003 | Li | ................. | 327/536 |
| 2004/0008077 A1 * | 1/2004 | Ho et al. | ....................... | 327/536 |
| 2005/0057300 A1 * | 3/2005 | Ishii | ............... | 327/536 |
| 2006/0290410 A1 * | 12/2006 | Saether | ......................... | 327/536 |
| 2008/0303585 A1 * | 12/2008 | Kawashima | .................. | 327/536 |
| 2009/0184751 A1 * | 7/2009 | Park et al. | ..................... | 327/535 |

OTHER PUBLICATIONS

Lee et al., "A Regulated Charge Pump with Small Ripple Voltage and Fast Start-Up," IEEE Journal of Solid-State Circuits, vol. 41, No. 2, pp. 425-432, Feb. 2006.
Richelli et al., "A 1.2-to-8V Charge-Pump with Improved Power Efficiency for Non-Volatile Memories," IEEE International Solid-State Circuits Conference, 3 pages, Feb. 14, 2007.
John F. Dickson, "On-Chip High-Voltage Generation in MNOS Integrated Circuits Using an Improved Voltage Multiplier Technique," IEEE Journal of Solid-State Circuits, vol. SC-11, No. 3, pp. 374-378, Jun. 1976.
Tanzawa et al., "A Dynamic Analysis of the Dickson Charge Pump Circuit," IEEE Journal of Solid State Circuits, vol. 32, No. 8, pp. 1231-1240, Aug. 1997.

* cited by examiner

*Primary Examiner* — Lincoln Donovan
*Assistant Examiner* — Brandon Cole
(74) *Attorney, Agent, or Firm* — William B. Kempler; Wade J. Brady, III; Fredrick J. Telecky, Jr.

(57) ABSTRACT

Multistage charge pumps with diode loss compensation are disclosed. In one example, a pre-regulated charge pump to generate a voltage is described. The example pre-regulated charge pump includes a charge pump having a plurality of stages and one or more diodes. The stages are configured to generate an output voltage at an output terminal based on an input voltage and a number of the multiplier stages. The example pre-regulated charge pump also includes a pre-regulator stage configured to adjust the input voltage to remove dependency on supply voltage variation. The pre-regulator includes a feedback diode configured to compensate for one or more voltage drops associated with the one or more charge pump diodes.

17 Claims, 5 Drawing Sheets

MULTISTAGE CHARGE PUMPS WITH DIODE LOSS COMPENSATION

RELATED APPLICATIONS

This patent claims the benefit of U.S. Provisional Patent Application No. 61/045,155, filed on Apr. 15, 2008, the entirety of which is incorporated by reference.

FIELD OF THE DISCLOSURE

This disclosure relates generally to charge pumps and, more particularly, to multistage charge pumps with diode loss compensation.

BACKGROUND

Charge pumps, or voltage multipliers, are commonly used in integrated circuit (IC) applications to boost a main supply voltage to a higher voltage. In some applications, the higher voltage must be generated internally within the IC to avoid the use of an externally-applied voltage. Post-regulated charge pumps, which sense the output voltage of the charge pump and utilize a control loop to regulate the output voltage, offer voltage accuracy at the expense of increased complexity and power consumption. However, not all applications require the voltage accuracy provided by post-regulation and, therefore, added overhead associated with post-regulation.

Applications that do not require high accuracy often utilize unregulated charge pumps, which result in a reduced complexity and smaller area requirement. However, output voltages that stray outside the application voltage limits, even in applications not requiring high accuracy, may result in stress on a load device and/or other undesirable effects.

SUMMARY

Multistage charge pumps with diode loss compensation are disclosed. In one example, a pre-regulated charge pump to generate a voltage is described. The example pre-regulated charge pump includes a charge pump having a plurality of stages and one or more diodes. The stages are configured to generate an output voltage at an output terminal based on an input voltage and a number of the multiplier stages. The example pre-regulated charge pump also includes a pre-regulator stage configured to adjust the input voltage in response to a change in a load current at the output terminal. The pre-regulator includes a feedback diode configured to compensate for one or more voltage drops associated with the one or more charge pump diodes.

DETAILED DESCRIPTION

Certain examples are shown in the above-identified figures and described in detail below. In describing these examples, like or identical reference numbers may be used to identify common or similar elements. The figures are not necessarily to scale and certain features and certain views of the figures may be shown exaggerated in scale or in schematic for clarity and/or conciseness. Although the following discloses example apparatus, it should be noted that such apparatus are merely illustrative and should not be considered as limiting. The example circuits described herein may be implemented using discrete components, integrated circuits (ICs), or any combination thereof. Accordingly, while the following describes example apparatus, persons of ordinary skill in the art will readily appreciate that the examples are not the only way to implement such apparatus.

The example devices described herein may be used to provide a charge pump with diode loss compensation to provide improved output voltage accuracy. The improved accuracy is accomplished with little IC substrate area impact and little or no additional power consumption. In one described example, a Dickson charge pump is provided with a pre-regulator device. The Dickson charge pump includes several multiplier stages that increase an input voltage to achieve an output voltage. In one example, each multiplier stage includes a diode that results in a voltage loss, with the aggregate voltage loss potentially varying significantly during operation based on temperature and IC process. The pre-regulator compensates for the voltage loss caused by the diodes in the Dickson charge pump by including a feedback diode, through which a current flows to approximate the current flowing through the Dickson charge pump, and by adjusting the input voltage to the Dickson charge pump to approximate changes in the voltage losses caused by the multiplier stage diodes. The example device substantially reduces the temperature and process dependence of variations in the Dickson charge pump output voltage.

Figure 1:
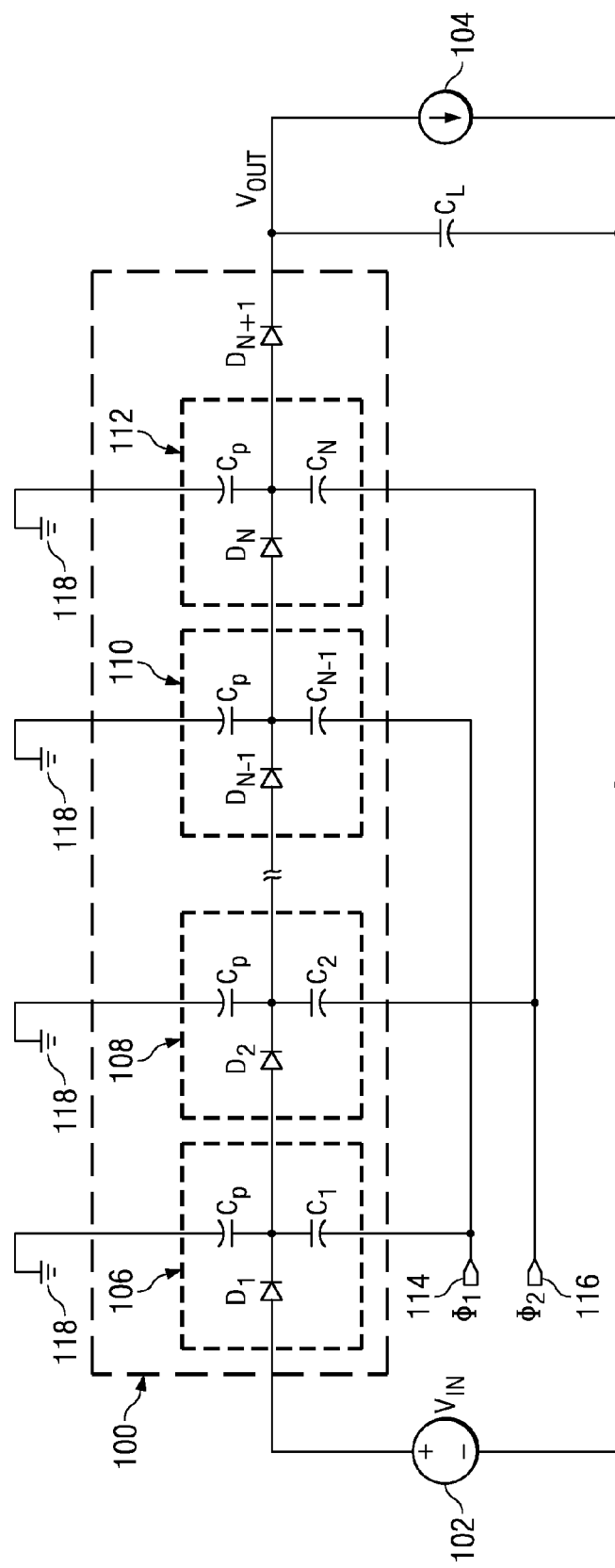
FIG. 1 is a schematic diagram of an unregulated Dickson charge pump.

FIG. 1 is a schematic diagram of an unregulated Dickson charge pump 100. The charge pump 100 receives an input voltage ($V_{IN}$) from a voltage supply 102 and generates an output voltage ($V_{OUT}$) to supply and output load 104. To this end, the charge pump includes N multiplier stages 106, 108, 110, and 112, each of which includes a diode $D_1$ to $D_N$ and a charging capacitor $C_1$ to $C_N$. The diodes $D_1$ to $D_N$ function as reverse-blocking diodes to ensure the correct flow of charge from the voltage supply 102 to the output load 104. The charging capacitors $C_1$ to $C_N$ are alternately coupled to clock signals 114 and 116. The output load 104 includes a load capacitor $C_L$ to store charge and to filter output voltage ripple.

The multiplier stages 106, 108, 110, and/or 112 may experience parasitic capacitance. The parasitic capacitance is illustrated by parasitic capacitors $C_p$, which are not physical capacitors but illustrative of the effects of parasitic capacitance.

Figure 2:
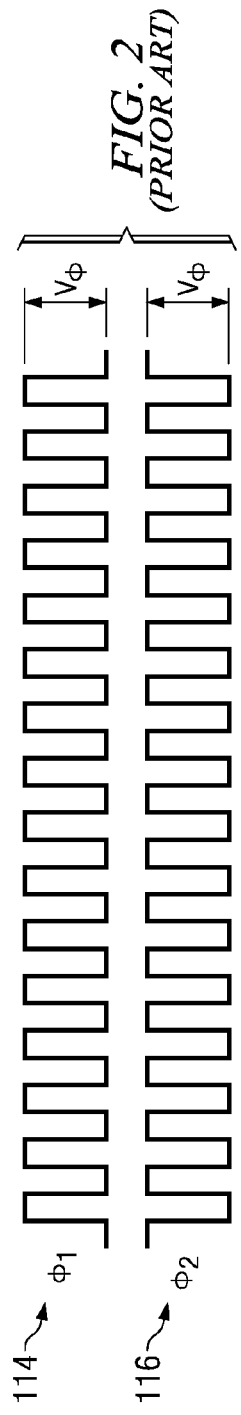
FIG. 2 is a diagram illustrating the phase relationships of the example clock signals shown in FIG. 1.

The clock signal 114 has a phase $\phi_1$ and the clock signal 116 has a phase $\phi_2$. FIG. 2 is a diagram illustrating the phase relationships of the example clock signals 114 and 116 shown in FIG. 1. As shown in FIG. 2, the example clock signals 114 and 116 are 180° out of phase with respect to each other and have an amplitude $V_\Phi$. With respect to FIG. 1, $V_\Phi$ is equal to $V_{IN}$. When the clock signal 116 is low (e.g., 0 V) and the clock signal 114 is high (e.g., $V_{101}$), the capacitors $C_2$ and $C_N$ are charged from the previous stages, respectively. For example, $C_2$ is charged via the diode $D_2$ by the capacitor $C_1$, and $C_N$ is charged via $D_N$ by the capacitor $C_{N-1}$. Once the capacitors $C_2$ and $C_N$ are charged, the clock signal 116 goes high and the clock signal 114 goes low, and the voltages at the positively-charged terminals of the charging capacitors increase accordingly, which cause the multiplier stages 108 and 112 to charge the next stages in sequence. The multiplier stage 112, however, generates $V_{OUT}$ via the diode $D_{N+1}$.

The unregulated Dickson charge pump 100 has an output voltage $V_{OUT}$ that can be approximated by Equation 1:

$$V_{OUT} = V_{IN} + N \left[ \dfrac{\left(\dfrac{C_n}{C_n + C_p}\right) V_{IN} - \dfrac{I_L}{(C_n + C_p)f}}{V_D - \dfrac{I_L}{(C_n + C_p)f}} \right] - V_D, \quad \text{(Eq. 1)}$$

where N is the number of multiplier stages 106, 108, 110, and 112, $V_D$ is the voltage drop across each diode $D_1$ to $D_{N-1}$, $C_p$ is a parasitic capacitance of each multiplier stage 106-112, f is the frequency of the clock signals 114 and 116, and $I_L$ is the load current 104. Equation 1 also assumes that $C_1 = C_2 = \ldots = C_N = C_n$, which can be assigned based on the requirements of an application (i.e., the output load 104). The parasitic capacitance, which may or may not be present in the circuit, is represented by capacitors $C_p$ coupling the charging capacitors to a ground reference 118.

Further, assuming that $C_p \ll C_n$, and denoting $R_s$ to be the output resistance of the charge pump 100 as shown in Equation 2, Equation 1 may be rewritten as shown in Equation 3:

$$R_s = \dfrac{N}{(C_n + C_p)f}, \quad \text{(Eq. 2)}$$

$$V_{OUT} = V_{OUT,ideal} - V_{error} \approx (N+1)(V_{IN} - V_D) - R_s I_L \quad \text{(Eq. 3)}$$

where, $$V_{OUT,ideal} = (N+1) \cdot V_{IN}, \text{ and} \quad \text{(Eq. 4)}$$

$$V_{error} \approx (N+1)(V_D) + R_S I_L. \quad \text{(Eq. 5)}$$

The voltage $V_{error}$ is due to the non-zero output resistance $R_s$ of the charge pump 100, and the voltage drop $V_D$ caused by each of the diodes $D_1$ to $D_{N+1}$. Thus, as illustrated by Equation 5, $V_{error}$ represents voltage loss with respect to the ideal output voltage $V_{OUT,ideal}$ and includes the diode voltage drop $V_D$ multiplied by the number of diodes N+1.

Figure 3:
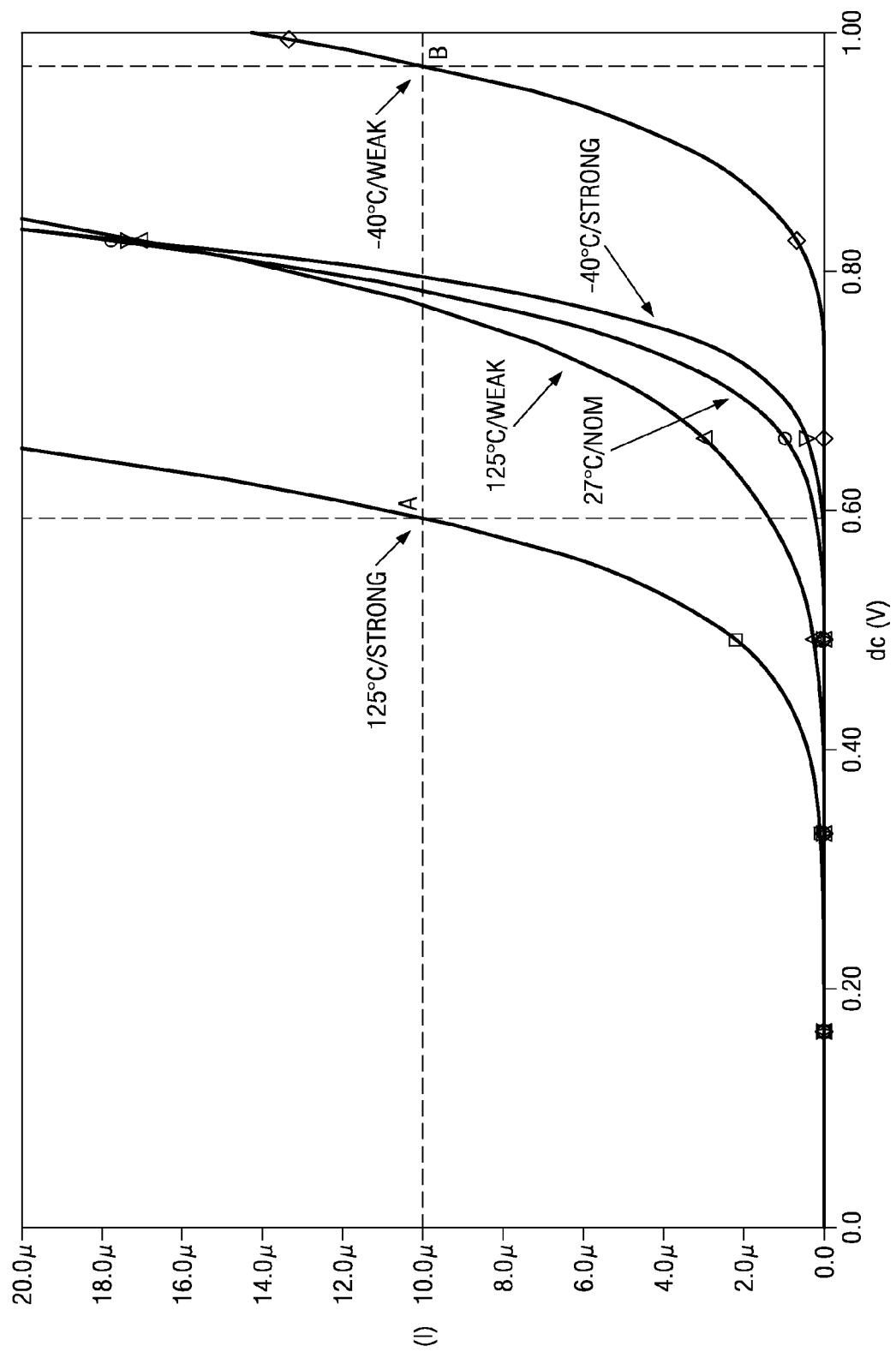
FIG. 3 is a diagram of example I-V diode characteristics across several temperature and process variations.

The voltage drop $V_D$ is a strong function of process and temperature. FIG. 3 is a diagram of example I-V diode characteristics across several temperature and process variations. The I-V diode characteristics of FIG. 3 may apply to the diodes $D_1$ to $D_{N+1}$ of FIG. 1. As shown in FIG. 3, the variation on $V_D$ for a fixed load current $I_L$ and a temperature range from −40° C. using a weak IC process to 125° C. using a strong IC process can be approximately 400 millivolts (mV). In applications requiring many multiplier stages (i.e., low input voltage, high output voltage), the output variation resulting from the variation at each of the several diodes $D_1$ to $D_{N+1}$ can be very high. The variation in the output voltage $V_{OUT}$ is also represented by variation in $V_{error}$ as shown in Equation 5.

Figure 4:
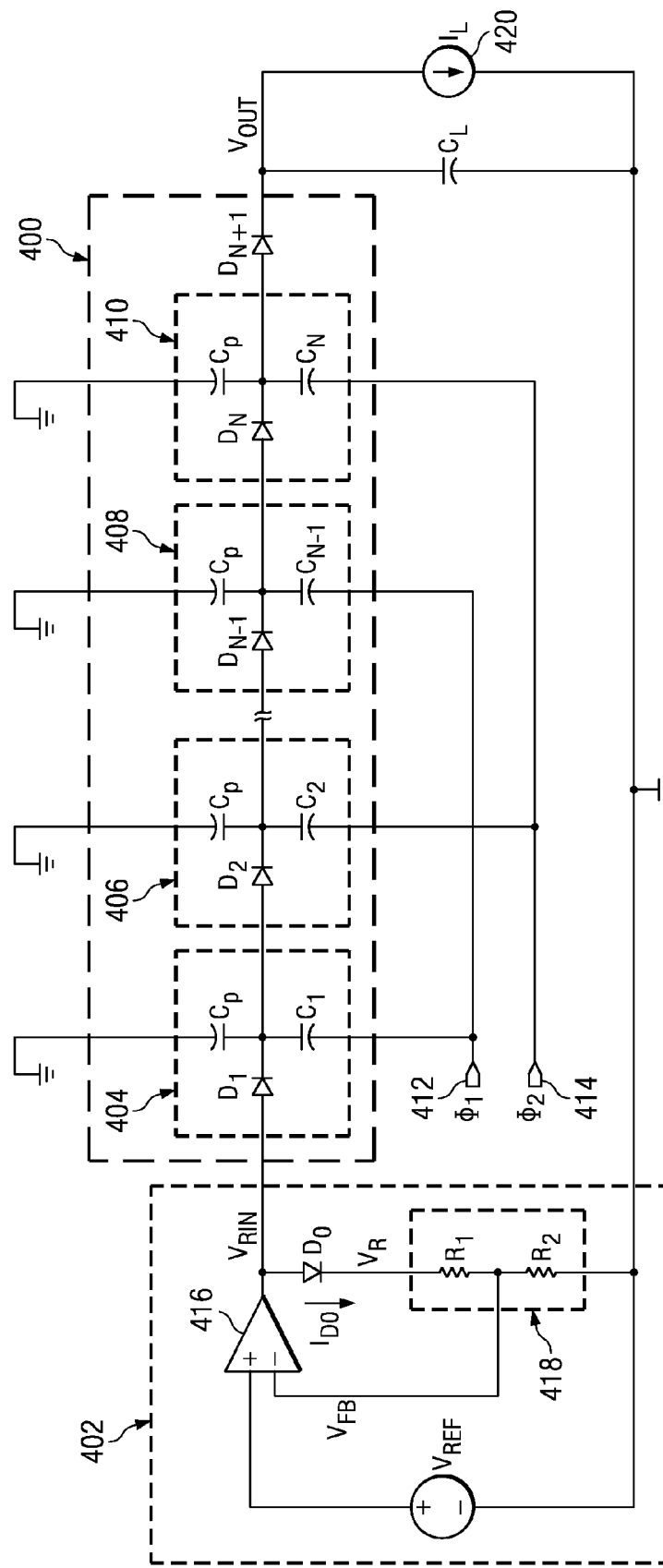
FIG. 4 is a schematic diagram of an example pre-regulated charge pump with diode loss compensation.

FIG. 4 is a schematic diagram of an example pre-regulated charge pump with diode loss compensation. The example charge pump 400 may be used to generate a high voltage for applications such as non-volatile memory. To correct for output voltage variations caused by process and temperature differences as described above, the example charge pump 400 includes a pre-regulator circuit 402. The pre-regulator 402 monitors the variance in the diode voltage drops $V_D$, as well as the output load current from the charge pump 400, and adjusts the input voltage to the charge pump 400 to substantially reduce the variance in the charge pump output voltage.

The example charge pump 400 includes N multiplier stages 404, 406, 408, and 410, which are similar to the multiplier stages 106, 108, 110, and 112, respectively, described in FIG. 1. The multiplier stages 404, 406, 408, and 410 are driven by clock signals 412 and 414, which have phases $\phi_1$ and $\phi_2$, respectively. The phases $\phi_1$ and $\phi_2$ have a phase relationship as illustrated in FIG. 2, and $V_\Phi$ is equal to $V_{RIN}$ with respect to FIG. 4.

The example pre-regulator 402 includes a low-dropout regulator (LDO) 416, which generates a pre-regulated input voltage ($V_{RIN}$) that serves as the input voltage to the charge pump 400. The LDO 416 adjusts $V_{RIN}$ based on a comparison of a reference voltage ($V_{REF}$) with a feedback voltage ($V_{FB}$). The example LDO 416 has power provided by a voltage source ($V_{BAT}$) such as a battery. Although the voltage $V_{BAT}$ may vary, the pre-regulator 402 provides a consistent $V_{RIN}$ that compensates for the voltage drop $V_D$ over the diodes $D_1$ to $D_{N+1}$. The example pre-regulator 402 further includes a diode $D_0$ and a voltage divider 418, which is implemented utilizing a series combination of resistors $R_1$ and $R_2$. To appropriately monitor the variance of $V_D$ caused by process and temperature, the example diode $D_0$ is implemented to be the same as the diodes $D_1$ to $D_{N+1}$. Thus, the example diode $D_0$ follows the example I-V curves illustrated in FIG. 3 as the diodes $D_1$ to $D_{N+1}$.

The pre-regulated input voltage $V_{RIN}$ generated by the pre-regulator 402 may be expressed by Equation 6:

$$V_{RIN} = V_R + V_{D0} = V_{REF}\left(1 + \dfrac{R_2}{R_1}\right) + V_{D0}, \quad \text{(Eq. 6)}$$

where $V_{D0}$ is the voltage drop across the diode $D_0$. $V_R$ represents the voltage divided over the voltage divider 418. By applying $V_{RIN}$ as shown in Equation 6 to $V_{IN}$ of Equation 3, the output voltage $V_{OUT}$ is shown by Equation 7:

$$V_{OUT} \approx (N+1)(V_R + V_{D0} - V_D) - R_s I_L \quad \text{(Eq. 7).}$$

By assuming the current through the diode $D_0$ ($I_{D0}$) is within the same order of magnitude as a load current $I_L$ through a load device 420 (e.g., a few microamperes (μA)), $V_{D0}$ and $V_D$ are assumed to be approximately equal and $V_{OUT}$ can be approximated by Equation 8:

$$V_{OUT} \approx (N+1)\left(1 + \dfrac{R_2}{R_1}\right)V_{REF} - R_s I_L. \quad \text{(Eq. 8)}$$

The current $I_{D0}$ can be implemented to be approximately equal to $I_L$ by proper selection of the resistor values $R_1$ and $R_2$. $R_1$ and $R_2$ are selected according to Equations 8 and 9:

$$R_1 + R_2 = \dfrac{V_R}{I_L}. \quad \text{(Eq. 9)}$$

Thus, through the use of the pre-regulator 402 and proper selection of $R_1$ and $R_2$, the dependency of $V_{OUT}$ on the variation in $V_D$ is removed, resulting in a significant improvement in the accuracy of $V_{OUT}$. In contrast to the output voltage illustrated in Equation 3 describing the unregulated charge pump 100, $V_{OUT}$ is not dependent on $V_D$, as illustrated in Equation 8 describing the example charge pump 400 and the example pre-regulator 402. It is also noted that $V_{OUT}$, as shown in Equation 8, has no dependence on $V_{BAT}$. Thus, although $V_{BAT}$ may vary in voltage, $V_{OUT}$ is not substantially affected.

Although the example charge pump 400 and pre-regulator 402 are described with reference to a non-volatile memory load, any other appropriate load may be used at the output.

The example reference voltage $V_{REF}$ of FIG. 4 is based on a bandgap voltage reference that is often available in an IC, but other reference voltage sources may be used.

The example capacitors $C_1$ to $C_N$ of FIG. 4. are described as having substantially equal capacitance values. Depending on the application and the desired output voltage $V_{OUT}$, the capacitance values may be modified and/or may not all be equal.

The example resistors $R_1$ and $R_2$ are configured according to Equation 8 to provide a desired ratio, and are further constrained to limit the current flowing through the diode $D_0$. The resistor ratio may be modified depending on the application to achieve a particular output voltage.

Further, any one or more of the output voltage $V_{OUT}$, the resistors $R_1$ and $R_2$, the reference voltage $V_{REF}$, the number of multiplier stages N, and/or the frequency f may be modified depending on the application. It should be recognized that the foregoing equations may need to be modified to account for modifications in the described assumptions.

The example capacitors $C_1$ to $C_N$, the example diodes $D_0$ and $D_1$ to $D_{N+1}$, the example resistors $R_1$ and $R_2$, and the example regulator 416 are implemented on one IC. However, any or all of the example components may be implemented utilizing one or more additional ICs, one or more discrete components, or any combination thereof.

In an example of operation, the charge pump 400 and pre-regulator 402 are used in an IC to generate a high programming voltage sufficient to activate tunneling and hot-electron injection in a non-volatile memory device. It should be noted, however, that the examples described herein may be modified to be used with any charge pump that can benefit from pre-regulation to compensate for diode losses. In the example of FIG. 4, the regulator 416 is an LDO that maintains a relatively constant voltage. However, any regulator may be implemented to adjust the regulated input voltage based on a reference voltage and a feedback voltage.

Using Equations 2 and 9 to illustrate operation of the charge pump 400 and the pre-regulator 402, $V_{OUT}$ is dependent on the number N of multiplier stages 404-410 in the charge pump 402, the ratio of the resistors $R_2$ and $R_1$, the reference voltage $V_{REF}$, the charging and parasitic capacitances $C_p$ and $C_n$, the frequency f, and the load current $I_L$. In the illustrated example, N, $R_2$, $R_1$, $V_{REF}$, $C_p$, $C_n$, and f are substantially constant. Thus, the variability in $V_{OUT}$ is dependent on variation in $I_L$.

In an example of operation of the example charge pump 400 and the example pre-regulator 402, the operating temperature of the diodes $D_0$ and $D_1$ to $D_{N+1}$ is stable for a time, allowing $V_{OUT}$ to stabilize. The operating temperature of the diodes $D_0$ and $D_1$ to $D_{N+1}$ then increases. As illustrated by the I-V diode characteristics shown in FIG. 3, the increase in operating temperature reduces the voltage drops $V_D$ and $V_{D0}$ for a given current (e.g., $I_L$ or $I_{D0}$). The reduced voltage drop $V_D$ through the diodes $D_1$ to $D_{N+1}$ causes $V_{OUT}$ to increase. However, the pre-regulator 402 compensates by detecting the decrease in $V_{D0}$ corresponding to the decrease in $V_D$. The reduced $V_{D0}$ causes $V_{FB}$ to increase via the voltage divider 418. The increase in $V_{FB}$ is detected by the LDO 416, which reduces $V_{RIN}$ in response to the increase in $V_{FB}$, thereby causing $V_{OUT}$ to decrease. In this way, the pre-regulator 402 compensates for changes in VOUT caused by increases in diode operating temperature.

In another example of operation, the operating temperature of the diodes $D_0$ and $D_1$ to $D_{N+1}$ is stable for a time, allowing $V_{OUT}$ to stabilize. The operating temperature of the diodes $D_0$ and $D_1$ to $D_{N-1}$ then decreases. As illustrated by the I-V diode characteristics shown in FIG. 3, the decrease in operating temperature increases the voltage drops $V_D$ and $V_{D0}$ for a given current (e.g., $I_L$ or $I_{D0}$). The increased voltage drop $V_D$ through the diodes $D_1$ to $D_{N+1}$ causes $V_{OUT}$ to decrease. However, the pre-regulator 402 compensates by detecting the increase in $V_{D0}$ corresponding to the increase in $V_D$. The increased $V_{D0}$ causes $V_{FB}$ to decrease via the voltage divider 418. The decrease in $V_{FB}$ is detected by the LDO 416, which increases $V_{RIN}$ in response to the decrease in $V_{FB}$, thereby causing $V_{OUT}$ to increase. In this way, the pre-regulator 402 compensates for changes in $V_{OUT}$ caused by decreases in diode operating temperature.

Because the example charge pump 400 is pre-regulated, the output voltage $V_{OUT}$ is not regulated. Therefore, $V_{OUT}$ may vary in response to changes in the load current $I_L$. However, the pre-regulator 402 maintains a constant regulated input voltage $V_{RIN}$ to the charge pump 400 despite varying load current, output voltage, or battery supply voltage to the LDO 416.

Figure 5:
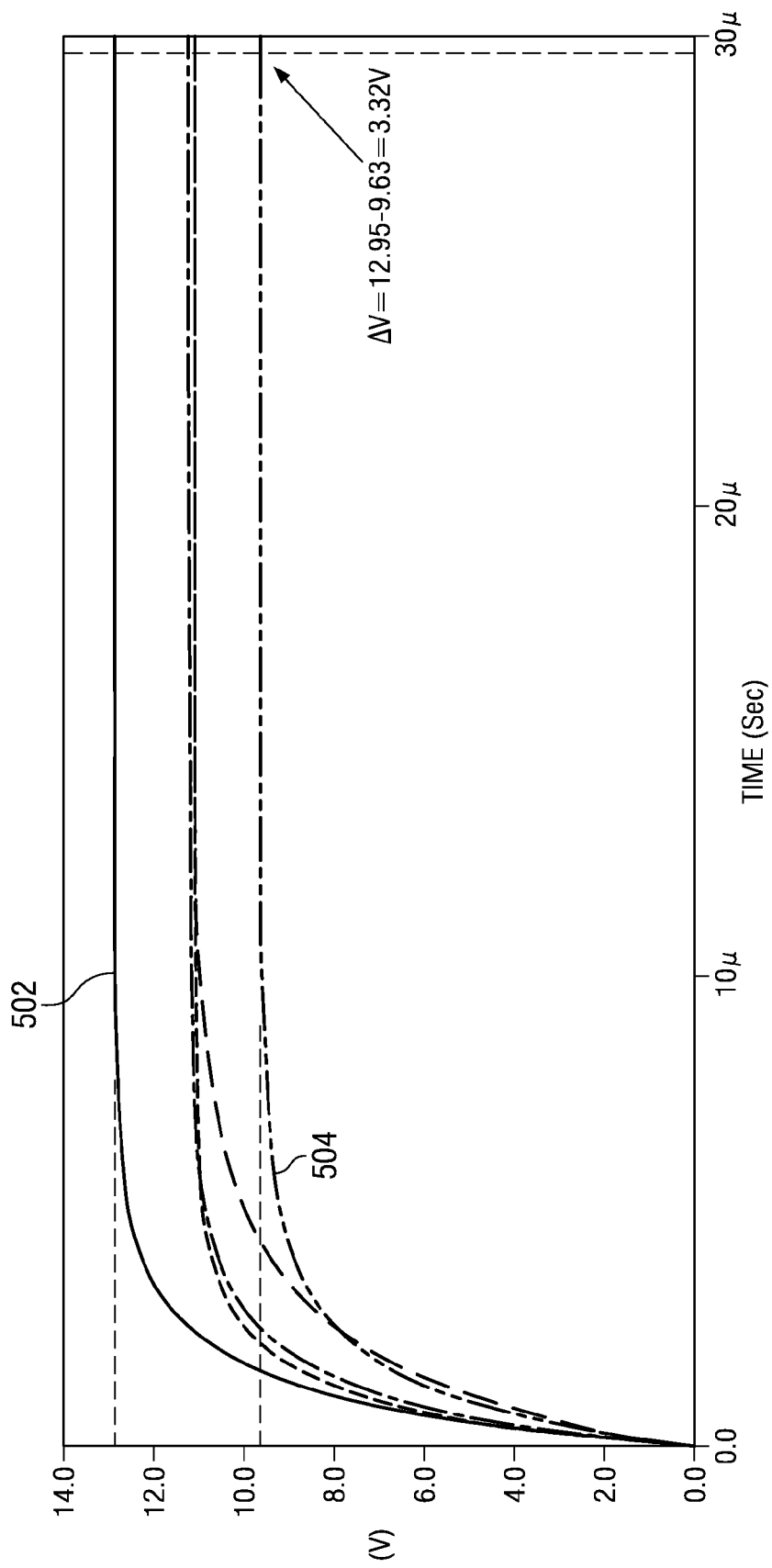
FIG. 5 is a diagram of charge pump voltage variations using the conventional charge pump of FIG. 1.

FIG. 5 is a diagram of charge pump voltage variations using the conventional charge pump 100 of FIG. 1. The diagram shows several voltage traces, including a voltage trace 502 varying at a much higher voltage and a voltage trace 504 varying at a much lower voltage. By analyzing the difference between the high voltage trace 502 and the low voltage trace 504, the accuracy of the conventional charge pump 100 can be determined to be approximately 3.32V.

Figure 6:
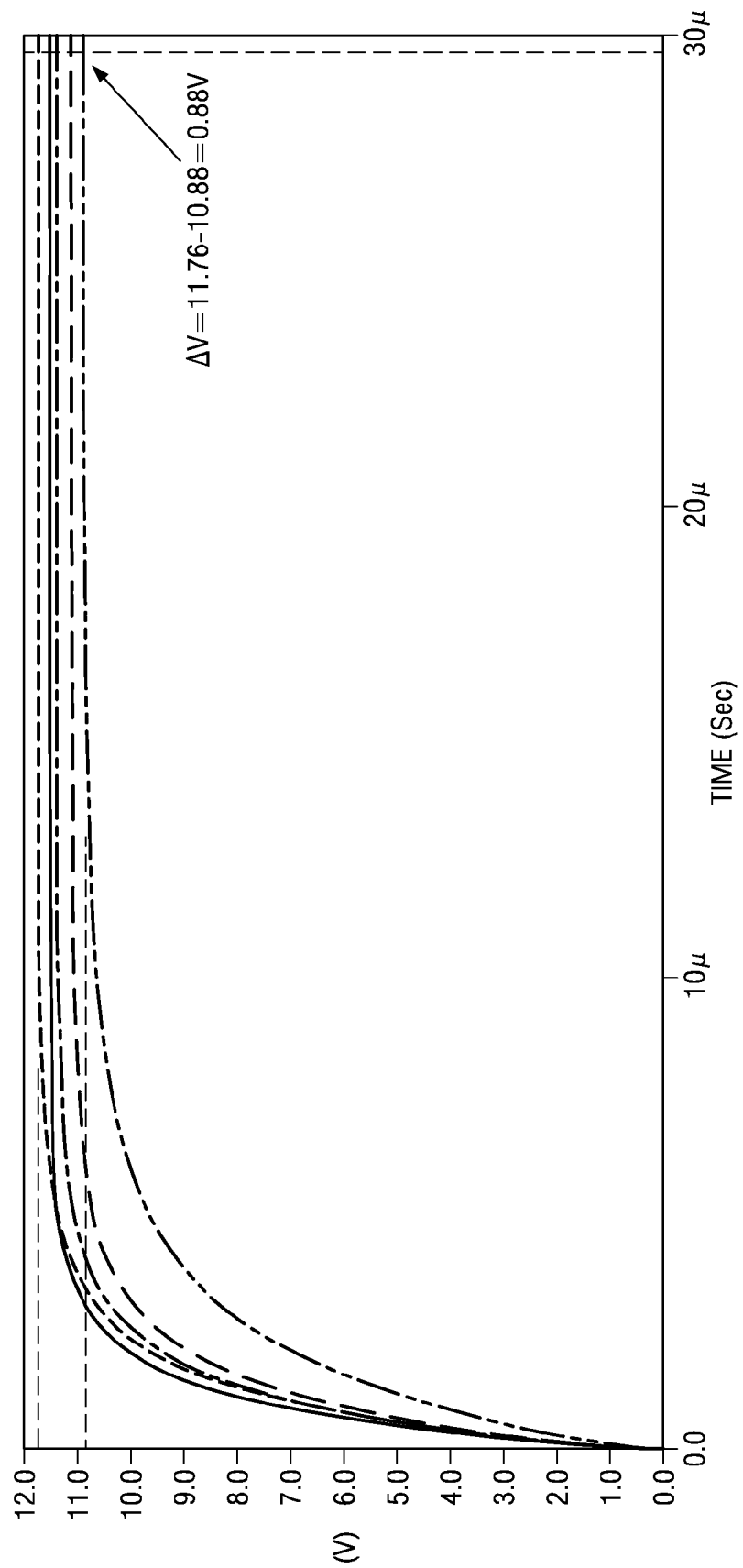
FIG. 6 is a diagram of charge pump voltage variations using the example pre-regulated charge pump of FIG. 4.

FIG. 6 is a diagram of charge pump voltage variations using the example pre-regulated charge pump of FIG. 4. As shown in FIG. 6, the variation between the highest voltage trace 602 and the lowest voltage trace 604 is much smaller, at approximately 0.88 V, than the variation between the traces 502 and 504 of FIG. 5. This results in a much higher voltage accuracy using the example charge pump 400 and pre-regulator 402 and, thus, better performance from an output load dependent thereon.

Although certain example methods and apparatus are described herein, other implementations are possible. The scope of coverage of this patent is not limited to the specific examples described herein. On the contrary, this patent covers all methods and apparatus falling within the scope of the invention.

What is claimed is:

1. A pre-regulated charge pump to generate a voltage, comprising:
   a charge pump comprising a plurality of stages and one or more diodes, configured to generate an output voltage at an output terminal based on an input voltage and a number of stages; and
   a pre-regulator stage configured to adjust the input voltage to the charge pump to compensate for one or more voltage drops associated with the one or more charge pump diodes, comprising a feedback circuit from an output of the pre-regulator stage to an input thereof, the feedback circuit comprising a compensation diode having an anode coupled to the input voltage to the charge pump and a voltage divider, the feedback circuit being configured to approximate a value of a load current of the charge pump through the compensation diode.

2. A pre-regulated charge pump as defined in claim 1, wherein the pre-regulator stage further comprises a voltage regulator, configured to adjust the input voltage based on a feedback voltage indicative of voltage drops over the charge pump diodes.

3. A pre-regulated charge pump as defined in claim 2, wherein the voltage divider comprises a plurality of resistors.

4. A pre-regulated charge pump as defined in claim 2, wherein the voltage regulator is configured to adjust the input voltage based on a reference voltage.

5. A pre-regulated charge pump as defined in claim 2, wherein the voltage regulator is a low-dropout regulator.

6. A pre-regulated charge pump as defined in claim 1, wherein the pre-regulator stage is configured to decrease the input voltage in response to an increase in temperature.

7. A pre-regulated charge pump as defined in claim 1, wherein each charge pump stage comprises a blocking diode.

8. A pre-regulated charge pump as defined in claim 7, wherein each charge pump stage further comprises a switching capacitor, and the charge pump stages are configured to charge the switching capacitors alternately in series based on a first charging signal and a second charging signal.

9. A pre-regulated charge pump as defined in claim 1, wherein the charge pump is configured as a Dickson charge pump.

10. A pre-regulated charge pump as defined in claim 1, wherein the feedback diode is configured to provide a voltage drop substantially equal to each of one or more voltage drops associated with one or more of the charge pump diodes.

11. A pre-regulated charge pump to generate a voltage, comprising:
    means for selectively charging and discharging a plurality of multiplier stages to generate an output voltage based on an input voltage;
    means for compensating for diode losses caused by the plurality of multiplier stages;
    means for regulating the input voltage based on a reference voltage and a feedback voltage; and
    diode means having an anode coupled to the input voltage and a diode current approximately equal to a load current of the means for selectively charging and discharging a plurality of multiplier stages for providing the feedback voltage based on the input voltage and the diode losses.

12. A pre-regulated charge pump as defined in claim 11, further comprising means for supplying charge to the plurality of multiplier stages.

13. A pre-regulated charge pump as defined in claim 11, wherein one or more of the multiplier stages is selectively charged by a previous multiplier stage via a first blocking diode and selectively charges another multiplier stage via a second blocking diode.

14. A pre-regulated charge pump as defined in claim 11, wherein the diode losses vary with temperature, and the input voltage is substantially constant despite variations in temperature.

15. A pre-regulated charge pump as defined in claim 11, wherein the means for providing the feedback voltage comprises a diode configured to compensate for the diode losses caused by the plurality of multiplier stages, and a voltage divider.

16. A pre-regulated charge pump as defined in claim 15, wherein the voltage divider comprises one or more resistors configured to approximate a current through the plurality of multiplier stages.

17. A pre-regulated charge pump to generate a high voltage, comprising:
    a Dickson charge pump comprising a plurality of multiplier stages, configured to generate an output voltage at an output terminal based on an input voltage and a number of stages, wherein each multiplier stage comprises a blocking diode and a charging capacitor; and
    a pre-regulator configured to adjust the input voltage, comprising:
        a reference generator to generate a reference voltage;
        a feedback circuit configured to provide a feedback voltage based on the input voltage; and
        a low-dropout regulator configured to generate the input voltage based on the reference voltage and a feedback circuit, wherein the feedback circuit comprises a diode having an anode coupled to the input voltage of the Dickson charge pump and a voltage divider, the feedback circuit being configured to have a current through the diode approximately equal to a load current of the Dickson charge pump to cause the low-dropout regulator to adjust the input voltage to compensate for voltage drops of the blocking diodes.

* * * * *